(12) United States Patent  
Buchheim et al.

(10) Patent No.: US 9,232,357 B2  
(45) Date of Patent: Jan. 5, 2016

(54) 3D LOCATION BASED ON WIRELESS TIME OF FLIGHT CALCULATION

(71) Applicant: SSI America, Inc., Fort Lauderdale, FL (US)

(72) Inventors: James Buchheim, Aventura, FL (US); Arne Hennig, Davie, FL (US)

(73) Assignee: GPB HOLDINGS II, LP, Ny, NY (US)

( * ) Notice: Subject to any disclaimer, the term of this patent is extended or adjusted under 35 U.S.C. 154(b) by 0 days.

(21) Appl. No.: 14/583,876

(22) Filed: Dec. 29, 2014

(65) Prior Publication Data

US 2015/0119077 A1  Apr. 30, 2015

Related U.S. Application Data

(63) Continuation-in-part of application No. 14/476,805, filed on Sep. 4, 2014, which is a continuation-in-part of application No. 14/079,756, filed on Nov. 14, 2013, now Pat. No. 8,847,754, which is a continuation-in-part of application No. 13/858,053, filed on Apr. 7, 2013, now Pat. No. 8,878,671, which is a continuation-in-part of application No. 13/848,095, filed on Mar. 21, 2013, now abandoned.

(60) Provisional application No. 61/920,794, filed on Dec. 26, 2013, provisional application No. 61/745,824, filed on Dec. 26, 2012, provisional application No. 61/757,244, filed on Jan. 28, 2013, provisional application No. 61/815,755, filed on Apr. 25, 2013, provisional application No. 61/872,780, filed on Sep. 2, 2013, provisional application No. 61/887,388, filed on Oct. 6, 2013, provisional application No. 61/891,932, filed on Oct. 17, 2013, provisional application No. 61/726,613, filed on Nov. 15, 2012.

(51) Int. Cl.  
*G08B 1/08* (2006.01)  
*H04W 4/04* (2009.01)  
*G01S 1/04* (2006.01)  
*H04W 4/00* (2009.01)

(52) U.S. Cl.  
CPC ............... *H04W 4/04* (2013.01); *G01S 1/042* (2013.01); *H04W 4/008* (2013.01); *H04W 4/043* (2013.01)

(58) Field of Classification Search  
CPC .................................................. G08B 21/0277  
See application file for complete search history.

(56) References Cited

U.S. PATENT DOCUMENTS 5,365,516 A * 11/1994 Jandrell ........................ 370/335  
2002/0127969 A1 * 9/2002 Meade, II ...................... 455/41  
2003/0222762 A1 * 12/2003 Beigl et al. .................... 340/5.92

* cited by examiner

*Primary Examiner* — Steven Lim  
*Assistant Examiner* — Omeed Alizada  
(74) *Attorney, Agent, or Firm* — Mark M. Friedman

(57) ABSTRACT

A method and system for indoor location of a mobile device, including: a server, the server adapted to calculate a position of a mobile device within a predefined area; a Master Beacon including: a first radio communications capability, a second radio communications capability, and a master processor, adapted to send data relating to the scan request packets via the second radio communications capability to the server, the data being sent together with a time stamp reflecting a time of receiving the scan request packets; and a plurality of Slave Beacons, each including: the first radio communications capability, a slave processor, adapted to send data relating to the scan request packets to the server, together with a time stamp; the server is adapted to calculate a respective distance of each the beacons from the mobile device.

15 Claims, 11 Drawing Sheets

Beacons and Mobile Device

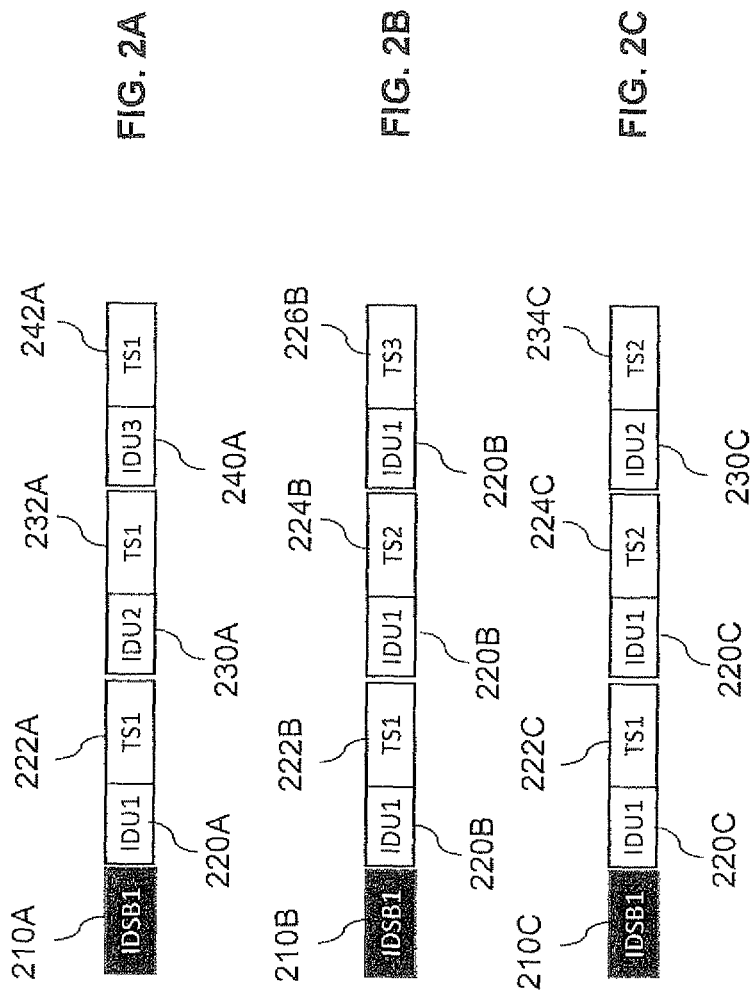

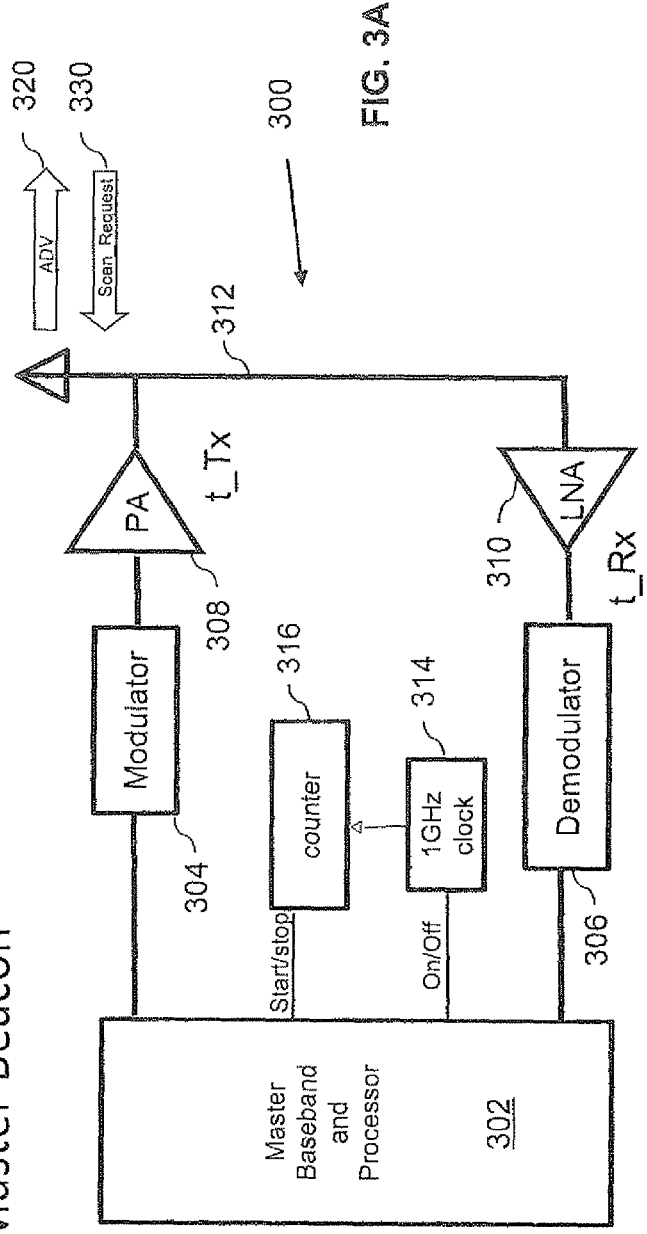
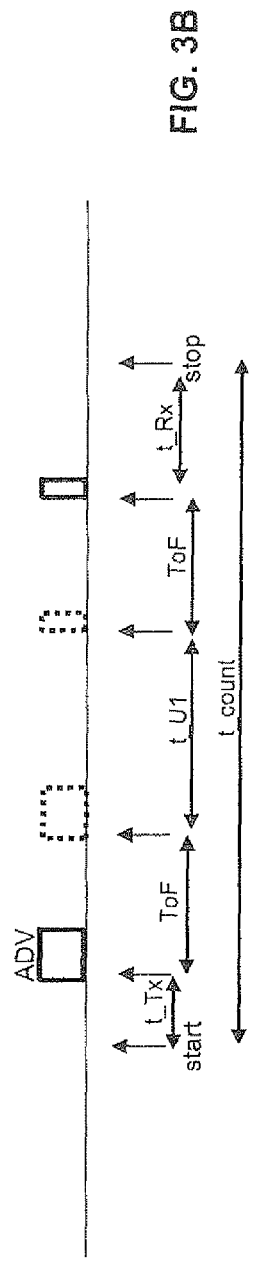
FIG. 3A
FIG. 3B

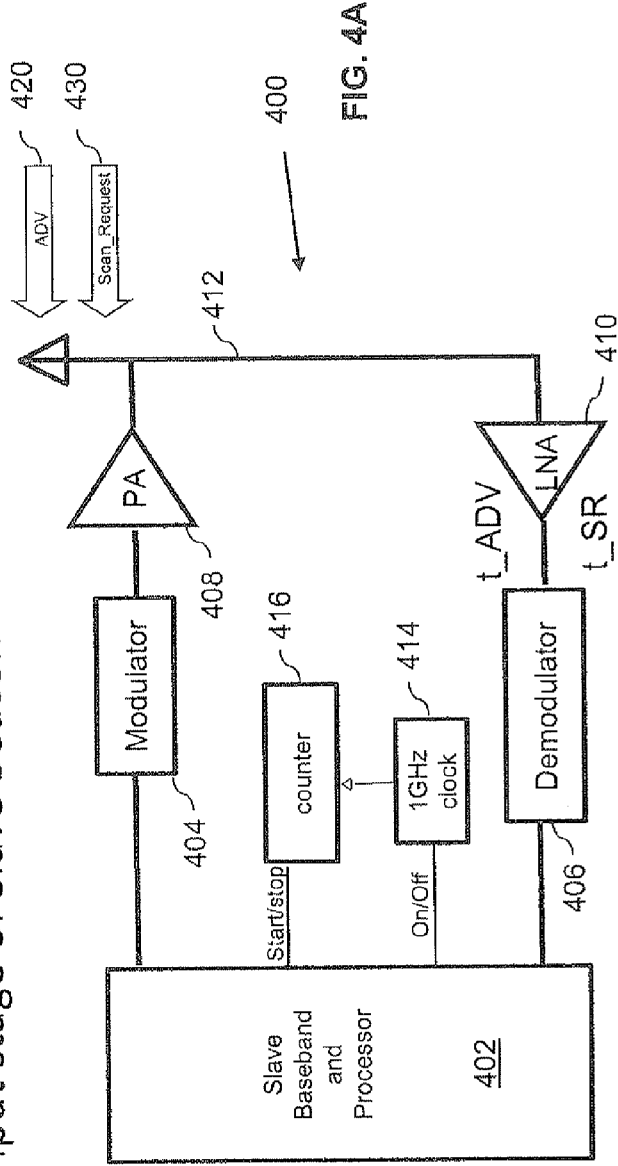
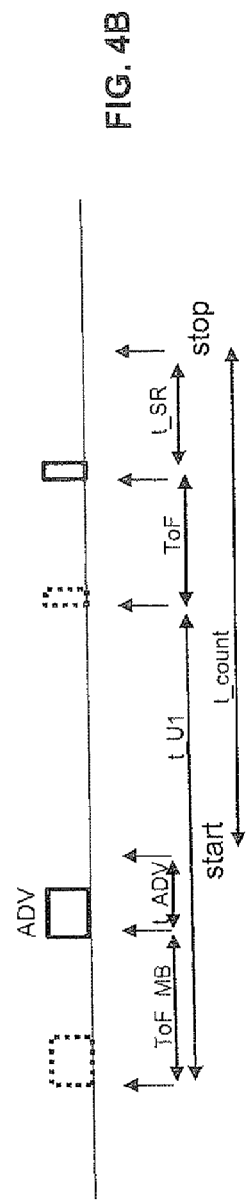
FIG. 4A
FIG. 4B

3D LOCATION BASED ON WIRELESS TIME OF FLIGHT CALCULATION

FIELD AND BACKGROUND OF THE INVENTION

The present invention relates to accurately calculating the position of wirelessly enabled mobile computing devices by using fixed time-synchronized beacons.

DEFINITIONS

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned.

A "mobile device", "mobile", "mobile communications device", "portable device", "mobile computing device" and any variations or combinations thereof, includes devices that can be transported, usually by a single individual, from place to place, and which have communications capabilities and/or computing abilities. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer. A server may be a local server that is accessible over a wired or wireless communications medium such as a Local Area Network (LAN), a Wireless Local Area Network (WLAN) or any variation thereof.

A "beacon", as referred to herein, has the general characteristics of wireless beacons known in the art unless stipulated otherwise. Beacons have a first wireless/radio communications technology (e.g. Bluetooth™, Bluetooth Low Energy™) for sending and/or receiving data packets. Some beacons (e.g. a Master Beacon) have a second wireless/radio technology (e.g. WiFi, cellular data communications) for transmitting and receiving data over a communications network and/or a computing network to a server as described above.

An "application", includes executable software, and optionally, any graphical user interfaces (GUI), through which certain functionality may be implemented.

SUMMARY OF THE INVENTION

According to the present invention there is provided an indoor location system, including: (a) a server, the server adapted to calculate a position of a mobile device within a predefined area; (b) a Master Beacon including: (i) a first radio communications capability, over which the master beacons is adapted to periodically broadcast advertising packets and to capture scan request packets broadcast from a mobile device, (ii) a second radio communications capability, over which the master beacon is adapted to transmit data packets to the server and receive data packets from the server, and (iii) a master processor, adapted to send data relating to the scan request packets via the second radio communications capability to the server, the data being sent together with a time stamp reflecting a time of receiving the scan request packets; and (c) a plurality of Slave Beacons, each the slave beacon including: (i) the first radio communications capability, adapted to capture the advertising packets and the scan request packets, and to transmit data packets (ii) a slave processor, adapted to send data relating to the scan request packets to the server, the data being sent together with a time stamp reflecting a time of receiving the scan request packets; the server is adapted to calculate a respective distance of each the beacons from the mobile device.

According to further features in preferred embodiments of the invention described below the respective distances are calculated based on a respective Time of Flight (ToF) value of a signal traveling between each of the beacons and the mobile device.

According to still further features in the described preferred embodiments the server is further adapted to calculate a location of the mobile device, based on the respective distances.

According to still further features, the master beacon is operationally coupled to, or integrated in, the server.

According to still further features, the slave beacons are adapted to send the data to the server via the master beacon.

According to still further features, each of the plurality of slave beacons further includes the second radio communications capability.

According to still further features, the server is a local server or a remote server.

According to still further features, the master beacon is further adapted to send a time stamp value, via the first radio communications capability, to the plurality of slave beacons and the slave beacons are adapted to synchronize with the master beacon based on the time stamp value.

According to still further features, the synchronization is effected based on the time stamp coupled with a respective known time delay of signal propagation from the master beacon to each of the plurality of slave beacons.

According to still further features, the slave processor is further adapted to measure the respective Time of Flight (ToF) values of the signal traveling between each of the slave beacons and the mobile device.

According to still further features, the master processor is further adapted to measure the Time of Flight (ToF) value of the signal traveling between the master beacon and the mobile device.

According to the present invention there is provided a method for calculating the indoor location of a mobile device, the method including the steps of (a) providing a system of claim 1; (b) broadcasting an advertising packet from the master beacon; (c) receiving a scan request packet, in response to the advertising packet, at the master beacon and the slave beacons; (d) calculating a respective Time of Flight (ToF) value for a signal traveling between the mobile device and each of the beacons, based on the scan response packet; (e) calculating a position of the mobile device based on the respective ToF values.

According to still further features, the ToF values are further calculated based on respective time stamps related to the scan response packet being received at each of the beacons.

According to still further features, the method further includes the step of sending the calculated position of the mobile device, to the mobile device.

In a preferred embodiment of the invention, a number of fixed beacons (typically 4) are attached on the wall (or ceiling) in an indoor venue (e.g. one in each corner). All beacons have a first wireless/radio technology (such as Bluetooth) for capturing data from the mobile devices and a second wireless/radio technology for sending the data to the cloud or local server. The second wireless technology may also be Bluetooth. In some embodiments, the beacons are time synchronized (one beacon acts as the master, the others as slaves). There may be several users with mobile devices (e.g. smartphones) in the venue. In some embodiments each beacon periodically sends data, securely, to a server via the cloud, by connecting to a nearby router. The nearby router may be one of the beacons.

The data in the cloud is used to calculate the position of all mobile devices (users) in the venue, using a positioning algorithm. The coordinates or position of each user can be 'pushed' to each other mobile device by an application installed on the device. In other embodiments, the position can be pushed to the other mobile devices without a dedicated mobile application, but rather showing up on a standard application (e.g. Google Maps™).

BRIEF DESCRIPTION OF THE DRAWINGS

Various embodiments are herein described, by way of example only, with reference to the accompanying drawings, wherein:

FIG. 2A-C are exemplary formats of a data packet that is sent by SB1 to the cloud;

FIG. 3A is a schematic diagram of a Master Beacon of the immediate invention;

FIG. 3B is a timeline of events in the input and output stages of the MB;

FIG. 4A is a schematic diagram of a Slave Beacon of the immediate invention;

FIG. 4B is a timeline of events in the input stage of the SB;

DESCRIPTION OF THE PREFERRED EMBODIMENTS

The innovation described hereafter pertains to the use of signal propagation delays in the system algorithm to calculate the position(s) of the mobile device(s). The location may be defined by X and Y coordinates (2D location) or X, Y and Z coordinates (3D location). In preferred embodiments, the systems and methods of the invention pertains to indoor location. In other embodiments, the systems and methods pertain additionally or alternatively to outdoor locations.

A periodically transmitted signal from the mobile device is received by all beacons. Preferably the signal is a Bluetooth signal. All the beacons in range capture data (with time stamps) from the mobile. All the beacons send the data to the cloud. The system algorithm hosted on the cloud calculates the position of each user. The more beacons used, the better the positioning accuracy. For example, with at least 4 beacons, the positioning results can be accurate to approximately 0.6 m.

The system uses existing radio/wireless technology in mobile devices, such as Bluetooth, WLAN and the like. As mentioned above, all beacons have a first wireless/radio technology (such as Bluetooth) for capturing data from the mobile devices and a second wireless/radio technology for sending the data to the cloud. The second wireless technology may also be Bluetooth. The system also provides a low power solution, whereby the mobile device can be in a standby state when broadcasting the signal/data. The position data can be pulled from the cloud by any other applications active on the mobile device.

The principles and operation of the 3D indoor positioning system using Time of Flight (ToF) according to the present invention may be better understood with reference to the drawings and the accompanying description.

Figure 1:
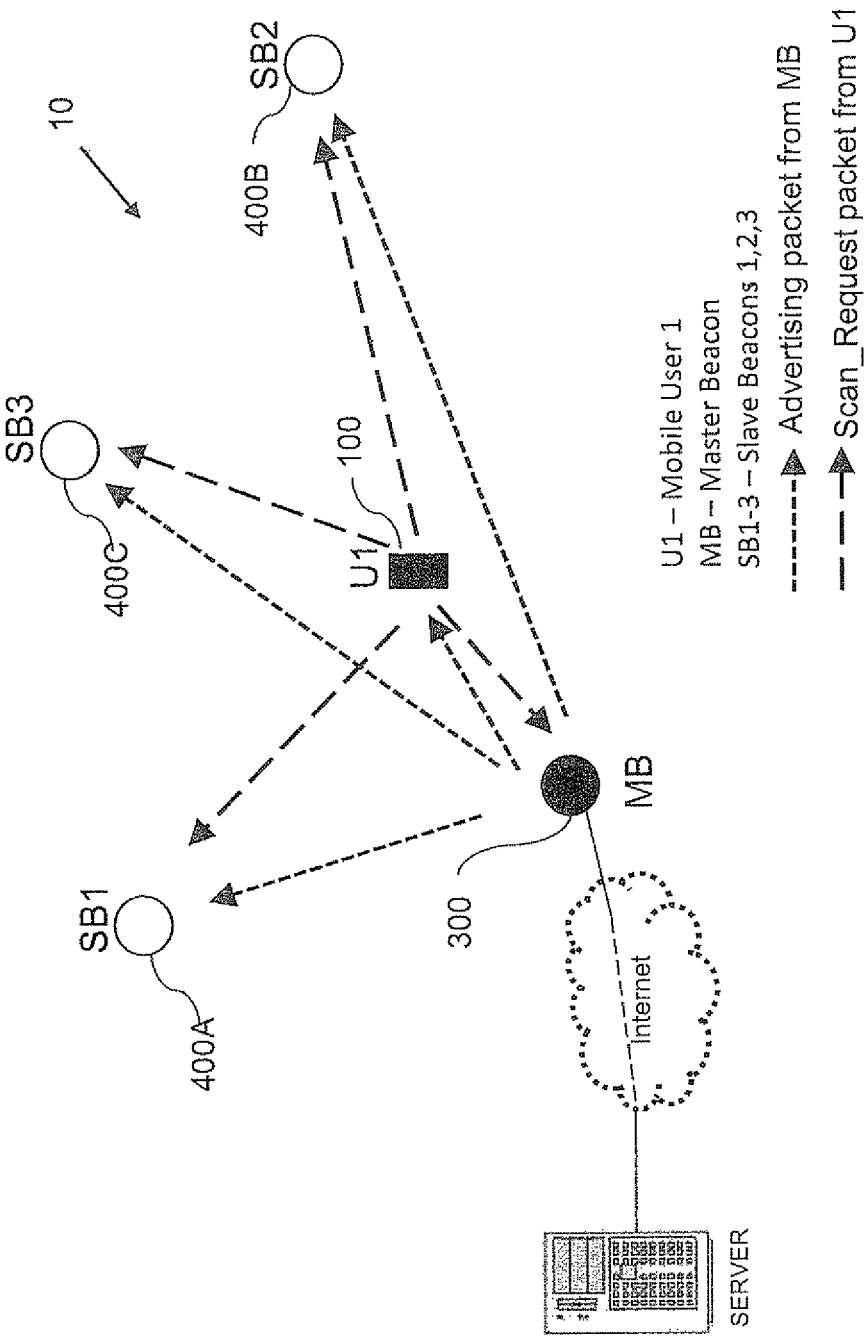
FIG. 1 is a diagram of a system of beacons in communication with a mobile user device.

Referring now to the drawings, FIG. 1 illustrates a system 10 of beacons in communication with a mobile user device (e.g. a smartphone). Four beacons are depicted in the Figure, a Master Beacon (MB) 300 and three Slave Beacons (SB1, SB2 and SB3) 400A, 400C, 400B. The beacons can be a standard Bluetooth (BL), Bluetooth Low Energy (BLE) beacon, Wifi etc. with at least a high-speed, accurate clock operating at 1 GHz, to provide 1 ns (one nanosecond) resolution. The beacon must additionally include a start/stop counter, also clocking at 1 GHz. The beacons are depicted in communication with a first mobile device User (U1) 100. In some embodiments, the beacons are connected over long range communications (e.g. via WiFi or cellular technology) to the cloud and/or server. In other embodiments, the server is local and may even be one of the beacons. In general, the Beacons have two operational modes: Synchronization Mode and Data Capture mode.

Synchronization Mode

In the synchronization mode, all the beacons periodically perform a time synchronization event so that the internal clocks of the beacons are synchronized to within 1 nanosecond (or another predefined amount of time) of each other. The internal clock of each beacon needs to be stable and accurate for at least a short period of time between synchronizations. That is to say that the beacon clocks need to be accurate from one synchronization event until the next time the beacons are synchronized. Master Beacon 300 serves as the time reference for all the other beacons. During a synchronization event, all the beacons are synchronized to Master Beacon 300.

MB 300 transmits a Time stamp value periodically (e.g. every one second). Slave Beacons SB1, SB2, SB3 400A, 400C, 400B periodically synchronize with the Time stamp value sent by the Master Beacon. The synchronization is performed by removing the time delay of signal propagation of the Master Beacon signal from the Master Beacon to each of the Slave Beacons. The signal propagation delay is calculated based on the known distance between the Master Beacon and each Slave Beacon.

For example, SB1 400A may be 7 meters away from MB 300. When SB1 400A receives a time stamp of 76:36:67 (i.e.

76 ms, 36 us, 67 ns) from MB, SB1 removes 23 ns (7 meters distance translates to 23 nanoseconds signal propagation delay) from the value and sets its clock to 76:36:44. 23 ns is calculated by using the speed of light 3×10^8 meters/second.

Data Capture Mode

A user with a mobile device, such as a smartphone, downloads and installs the system application on to the mobile device. Once activated on the mobile device, the application can exemplarily run in the background, without disturbing the regular functions of the device, or even when the screen is off (standby mode). When the mobile device is in the vicinity of the beacons it starts to periodically send out scan request packets over Bluetooth, or preferably Bluetooth Low Energy (BLE) (sending similar data packets over other wireless media and/or protocols is also an option). Each of the beacons receives data from the mobile device (i.e. the Scan Request packets, sent over BLE) and associates a time stamp with the first frame of the captured data. In the next step, the beacons all send the data to the cloud. Alternatively or additionally, the data can be sent to a local centralized server or to one of the Beacons, which acts as a server.

In use, MB 300 periodically transmits an advertising packet. For example, if MB 300 is an iBeacon™ then the MB transmits an iBeacon Advertising packet. All slave beacons enter into data capture mode. In data capture mode, the beacons are able to receive iBeacon (or similar/equivalent) packets as well as any Scan Request packets from mobile devices. All beacons (SB and MB) capture Scan Request packets. Typically, a scan request packet contains an ID of the mobile device that sent the scan request (IDU1). All beacons send the captured data to the cloud (either directly or indirectly).

FIG. 2A-C illustrate exemplary formats of a data packet that is sent by SB1 400A to the cloud. In the Figures, the leftmost data block is the ID, identifier, of SB1 400A which is transmitting the data. The identifier, labeled IDSB1 210A, is set at the beginning of the data packet. The next data block is the ID of the mobile device that sent the scan request packet. In the exemplary illustration, mobile device U1 100 is one of the mobile devices that sent a scan request. The data block is labeled IDU1 220A. The ID is followed by the time stamp when the scan request packet was received at the SB1. The block is labeled TS1 (Time Stamp 01) 222A.

In some configurations, the beacons may be configured to send the received data to the cloud only periodically, instead of after receiving each scan request. For example, once three scan request packets have been received by SB1, their time stamps (TS1, TS2 and TS3) are bundled into a single data packet sent to the cloud (or server, beacon etc.) (see e.g. FIG. 2B). Each time stamp is prefixed by an ID block. An example of three time stamps from three separate mobile devices U1, U2 and U3 are shown in FIG. 2A. Each device sends a scan request which is captured the SB1. The first data block is labeled IDU1 220A. The ID is followed by the time stamp when the scan request packet was received at the SB1. The block is labeled TS1 222A. The second data block is labeled IDU2 230A. The related time stamp block is labeled TS1 232A. The third data block is labeled IDU3 240A. The related time stamp block is labeled TS1 242A.

A second example of three time stamps from a single device, U1, is shown in FIG. 2B. The leftmost data block is the ID of SB1 400A which is transmitting the data. The identifier is labeled IDSB1 210B. The first data block after the header is labeled IDU1 220B. The ID is followed by the time stamp block labeled TS1 222B. The second data block is also labeled IDU1 220B. The related time stamp block is labeled TS2 224B. The third data block is also labeled IDU1 220B. The related time stamp block is labeled TS3 226B.

A third example of two time stamps from one mobile device, U1, and a third time stamp from a second mobile device, U2, is shown in FIG. 2C. The leftmost data block is the ID of SB1 400A which is transmitting the data. The identifier is labeled IDSB1 210C. The first data block after the header is labeled IDU1 220C. The ID is followed by the time stamp block labeled TS1 222C. The second data block is also labeled IDU1 220C. The related time stamp block is labeled. TS2 224C. The third data block is labeled IDU2 230C. The related time stamp block is labeled TS2 234C.

Position Calculation

With sufficient data, the precise position of the mobile device can be calculated. In the running example continued from above, the cloud/server receives data from all the beacons. Each beacon will receive the same scan request packet at a different time, due to the differences in distance between the mobile device and the various beacons. The system uses the time differences on the various time stamps of the same scan request event, but from different beacons, to calculate the relative time delays. For example:

TofMB—time of flight from U1 to MB (e.g. 14 ns)
TofSB1—time of flight from U1 to SB1 (e.g. 17 ns)
TofSB2—time of flight from U1 to SB2 (e.g. 29 ns)
TofSB3—time of flight from U1 to SB3 (e.g. 22 ns)

Each of the above values is converted to meters by using the conversion of 1 ns=0.3 m. Therefore, for example, 14 ns of TofMB is converted to 4.2 m, etc. The next step is to use the equation for calculating the circumference of a circle, $x^2+y^2=r^2$ and simultaneous equations for all circles. The X,Y coordinates of each beacon is known, as the beacons are static and their locations known. The radius (r) of each circle is defined by the distance between the beacon and the mobile device (U1), which is calculated based on Time of Flight (ToF) discussed above. The position of U1 can then be calculated as latitude and longitude based on the known values/positions of each beacon. Alternatively, or additionally, 3D positioning of the mobile device can be calculated using the same beacons and data, by adding a value for the altitude. 3D position location uses spheres instead of circles.

Various options exist for sending the data to the cloud. In one configuration, the beacons relay the data to the cloud/server over the local WiFi. In another configuration, the Master Beacon can be enabled with cellular data technology (e.g. 3G) as well as BLE. The MB communicates with the Slave Beacons and the mobile devices via BLE and connects to the cloud/server via the cellular data technology. In some configurations, such as the aforementioned configuration, the slave beacons the slave beacons can be BLE only modules. The MB collects/receives all the data from the slave modules and transmits the data to the cloud.

In another possible configuration, the Synchronization mode is an optional mode only. Using synchronization makes the calculation of signal propagation delay much simpler. However, the following method obviates the need for ongoing synchronization. In the synchronization-less or non-Synchronization method, each Slave Beacon measures the time difference between the Advertising packet (from Master Beacon) and Scan Response packet (from the mobile device) captured in the data capture mode. The Master Beacon measures the time between sending the Advertising packet and receiving the scan request packet. Using the aforementioned measurements, the system calculates the distance between the beacons and the mobile device based on the Time of Flight of the signals there-between. What follows is a detailed description of the non-synchronization method for calculating the position of a mobile device, based on ToF.

Input/Output Stage of Master Beacon

FIG. 3A is a schematic diagram of a Master Beacon of the immediate invention. MB 300 depicted in the Figures includes a master baseband and processor unit 302, a modulator 304, a demodulator 306, a Power Amplifier (PA) 308, Low Noise Amplifier (LNA) 310, an antenna 312, a clock 314 and a counter 316.

The following abbreviations are used in FIG. 3A, 3B:
Tx=Transmission of a radio packet
Rx=Receiving of a radio packet
t_Tx=time to Transmit packet
t_Rx=Time to Receive packet
ADV=Advertising packet
t_counter=counter value in time
t_SR=time to Scan Response packet
ToF=Time of Flight The Baseband is the physical layer of the Bluetooth. It manages physical channels and links apart from other services like error correction, data whitening, hop selection and Bluetooth security. The Baseband layer lies on top of the Bluetooth radio layer in the bluetooth stack. The baseband also manages asynchronous and synchronous links, handles packets and does paging and inquiry to access and inquire Bluetooth devices in the area. The processor can be an integrated circuit (IC) device (e.g., a Large Scale Integrated Circuit (LSI)) that performs communication functions.

The modulator and demodulator are known in the art for varying one or more properties of a periodic waveform, called the carrier signal, with a modulating signal that typically contains information to be transmitted and then returning the signal to its previous state. The PA is a typical component in the Radio stage that increases the power of the signal which is transmitted from the antenna. The LNA is a typical component (or collection of components) that amplifies a weak signal received at the antenna. PA and LNA are standard parts of a radio system. The parts have included in the diagram in order to illustrate the signal delay between arrival at the antenna and the time the counter is started or stopped.

FIG. 3B is a timeline of events in the input and output stages of MB 300 as the MB sends an Advertising Packet to the mobile device U1 100 and receives a Scan Request packet back from the mobile device. Using counter 316, the MB logs the time of flight of the signals in order to calculate the distance between MB 300 and U1 100. As mentioned above, both the clock 314 and a counter 316 operate at 1 GHz in order to provide a resolution of one nanosecond. Referring to both FIGS. 3A and 3B and starting from the left-hand side of FIG. 3B and going from left to right, the following steps are stipulated:

Step 1, the counter is started when a Advertising Packet (ADV) 320 is generated at baseband/processor 302. The signal is modulated by modulator 304, power is attenuated according to need in PA 308 and the signal is sent from antenna 312. Step 1 is provides the Time to Transmit packet (t_Tx) parameter.

Step 2, is the Time of Flight (ToF) of the ADV until it is received at the first mobile device U1.

Step 3, is the time delay between U1 receiving the ADV and subsequently sending a Scan_Request 330 in response to ADV 320.

Step 4, is the Time of Flight of the Scan_Request packet from the mobile device U1 to MB 300.

Step 5, is the Time to Receive packet (t_Rx) which is measured from the time signal 330 reaches antenna 312, the signal is amplified by LNA 310, the signal demodulated by demodulator 306 and finally arriving at baseband/processor 302. At this point the counter is stopped and the elapsed time recorded.

Distance Calculation from MB to U1

Based on the steps detailed heretofore, the distance between MB 300 and the mobile device U1 is calculated as follows:

$$t\_counter = t\_Tx + 2*ToF + t\_U1 + t\_Rx \quad (1)$$

$$ToF = \tfrac{1}{2}(t\_counter - t\_Tx - t\_Rx - t\_U1) \quad (2)$$

The values: t_Tx, t_Rx, and t_U1 are fixed values and can be calibrated. These values are therefore known values. A signal propagates at 0.3 meters per nanosecond. Therefore, the distance between the mobile device U1 and MB 300 can be calculated as follows:

$$Distance = ToF * 0.3 \text{ meters} \quad (3)$$

Once the distance between the MB and the U1 is known, what remains is to measure the distance between each of the other slave beacons and then calculate the position of the mobile device based on the distances. Hereafter the distance between the mobile device and a slave beacon is discussed. Thereafter, the method of calculating the position of the mobile device will be discussed.

Figure 8:
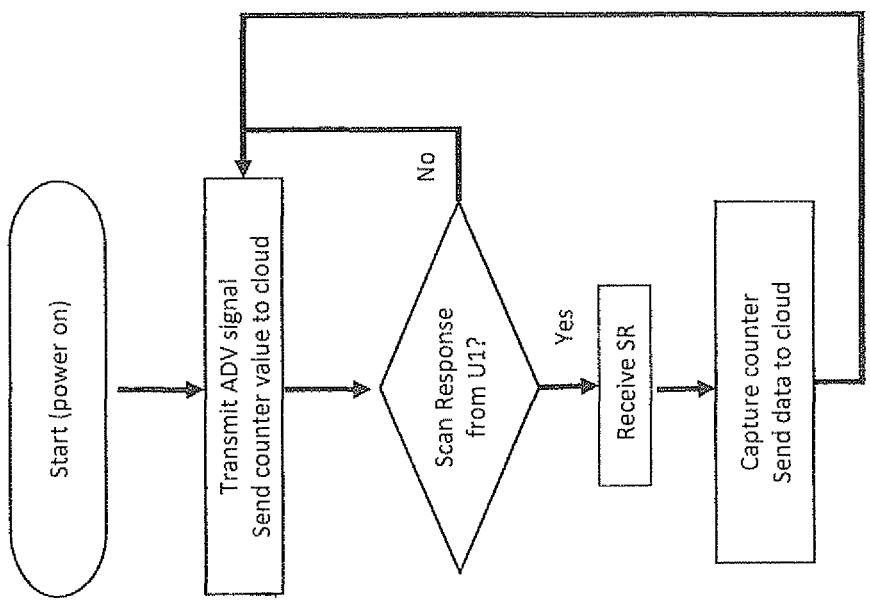
FIG. 8 is a flow chart detailing the operation of the MB both in Synchronized and non-synchronized modes.

FIG. 8 is a flow chart detailing the operation of the MB both in Synchronized and non-synchronized modes. The MB is powered on. The MB broadcasts the ADV signal/packet and sends counter value to the cloud/server. If a scan response signal/packet is received from the mobile device, then process the signal and capture the counter value. The counter value is then sent to the cloud/server. If the SR is not received then send next ADV packet/signal.

Input Stage of Slave Beacon

FIG. 4A is a schematic diagram of a Slave Beacon of the immediate invention. SB 400 depicted in the Figure includes a slave baseband and processor unit 402, a modulator 404, a demodulator 406, a Power Amplifier (PA) 408, Low Noise Amplifier (LNA) 410, an antenna 412, a clock 414 and a counter 416.

The following abbreviations are used in the Figures:
t_ADV=time to receive Advertising packet
t_counter=counter value in time
t_SR=time to receive Scan Response packet
ToF=Time of Flight FIG. 4B is a timeline of events in the input stage of SB 400. The Slave Beacons each measure the time from receiving the Advertising Packet from MB 300 until receiving the Scan Request packet from mobile device U1 100. Using counter 416, the SB logs the time of flight of the signals in order to calculate the distance between SB 400 and U1 100. The same process is effected on each of the Slave beacons SB1 400A, SB2 400B and SB3 400C. As mentioned above, both the clock 414 and a counter 416 operate at 1 GHz in order to provide a resolution of one nanosecond. Referring to both FIGS. 4A and 4B and starting from the left-hand side of FIG. 4B and going from left to right, the following steps are stipulated:

Step 1—ADV (Advertising Packet) is sent from MB 300 to both the Slave beacons and the mobile device(s) in the area. ToF_MB is the time of flight the signal takes to travel between the MB 300 and SB 400.

Step 2—ADV is received at SB 400 and the time delay between receiving ADV at the antenna and being relayed to baseband 402 is designated t_ADV.

Step 3—When the ADV arrives at baseband/processor 402, counter 416 is started.

Step 4—Concurrently to steps 2 and 3, Mobile device U1 also receives the ADV from MB 300 and the processing time of the mobile device U1 to respond with a Scan_Request (SR) packet is designated t_U1. SB 400 does not know the processing time at U1 (t_U1) and will have to receive this information from MB 300 in order to make the calculation discussed below.

Step 5—The signal propagation time of the Scan Request (SR) packet until it reaches SB 400 is designated Time of flight (ToF). The ToF value is the value needed in order to calculate the distance between the SB and the mobile device U1.

Step 6—The amount of time the SR packet takes to travel from antenna 412, be processed by the LNA 410, demodulated by Demodulator 406, and arrive at baseband 402 is designated t_SR. At this point counter 416 is stopped.

Distance Calculation from SB to U1

Based on the steps detailed heretofore, the distance between SB 400 and the mobile device U1 can be calculated as follows:

$$t\_counter = ToF + t\_SR + t\_U1 - ToF\_MB - t\_ADV \quad (1)$$

$$ToF = t\_counter - t\_SR - t\_U1 + ToF\_MB + t\_ADV \quad (2)$$

The values: t_SR, t_ADV, and ToF_MB are fixed values and can be calibrated. These values are therefore known values. T_U1 can be obtained from MB 300 is mentioned above. A signal propagates at 0.3 meters per nanosecond. Therefore, the distance between the mobile device U1 and SB 400 can be calculated as follows:

$$Distance = ToF * 0.3 \text{ meters} \quad (3)$$

As with the Synchronization method described above, the system uses the ToF values calculated above to work out the position of the mobile device. As in the example above, TofMB—time of flight from U1 to MB (e.g. 14 ns)
TofSB1—time of flight from U1 to SB1 (e.g. 17 ns)
TofSB2—time of flight from U1 to SB2 (e.g. 29 ns)
TofSB3—time of flight from U1 to SB3 (e.g. 22 ns)

Figure 5:
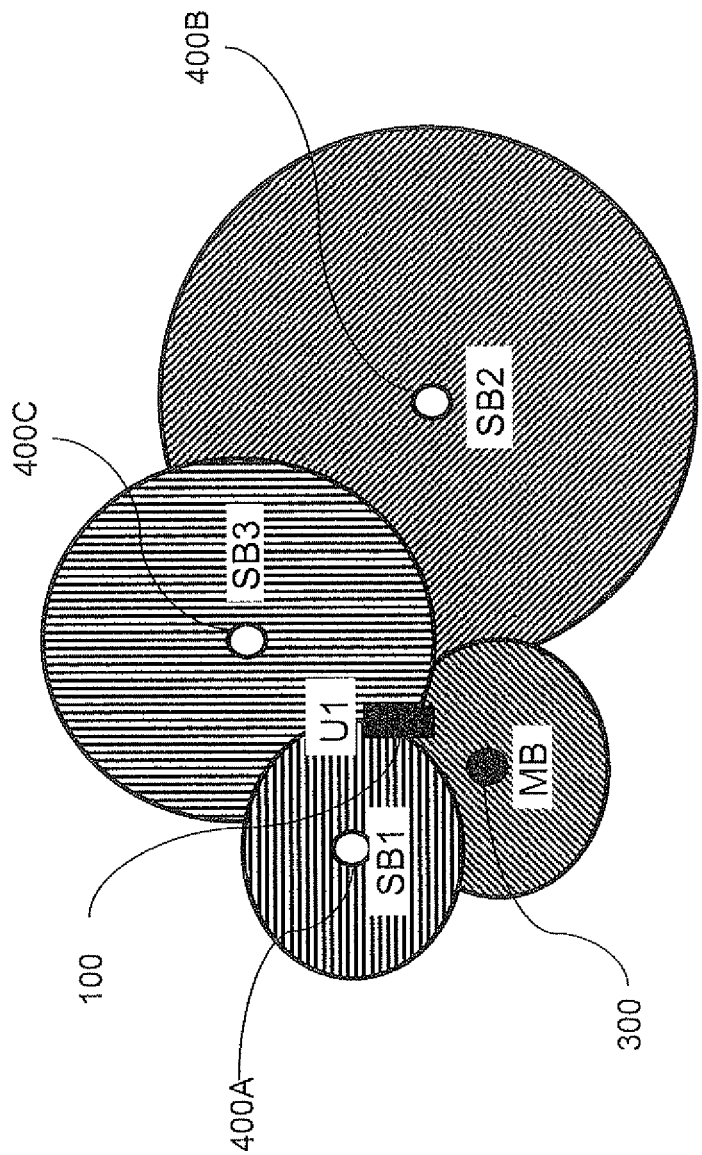
FIG. 5 is a schematic diagram of the circles calculated for each beacon based on the respective distance of each beacon to the mobile device U1.

Each of the above values is converted to meters by using the conversion of 1 ns=0.3 m. Therefore, for example, 14 ns of TofMB is converted to 4.2 m, 17 ns of SB1 is converted into 5.1 meters, etc. The next step is to use the equation for calculating the circumference of a circle, $x^2 + y^2 = r^2$ and simultaneous equations for all circles. FIG. 5 is a schematic diagram of the circles calculated for each beacon based on the respective distance of each given beacon to the mobile device U1 100. The X,Y coordinates of each beacon is known, as the beacons are static and their locations given. The radius (r) of each circle is defined by the distance between the beacon and the mobile device (U1), which is calculated based on Time of Flight (ToF) discussed above. The position of U1 can then be calculated as latitude and longitude based on the known values/positions of each beacon. Alternatively, or additionally, 3D positioning of the mobile device can be calculated using the same beacons and data, by adding a value for the altitude. 3D position location uses spheres instead of circles.

Figure 9:
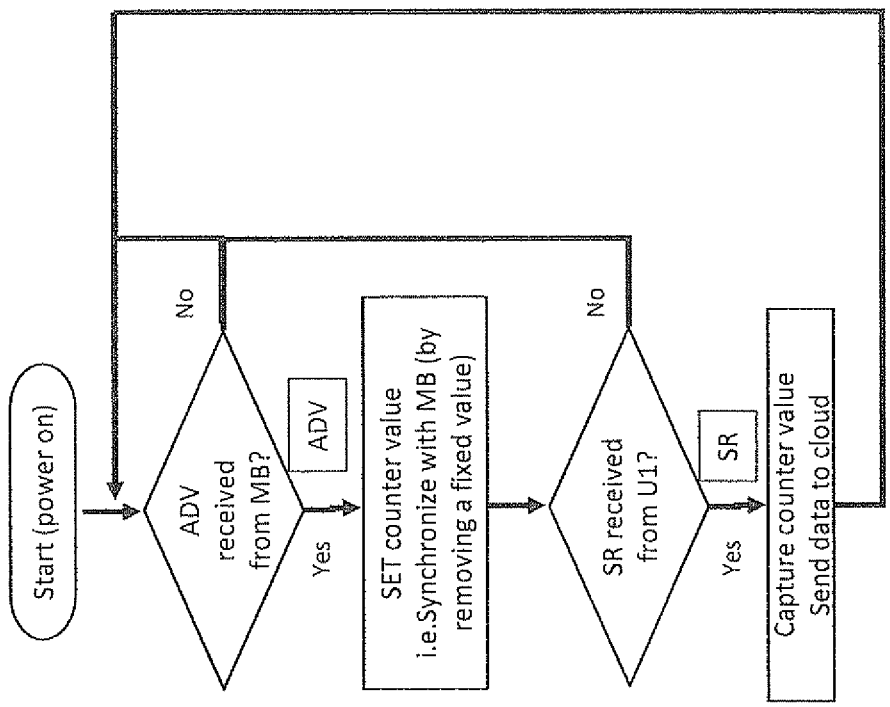
FIG. 9 is a flow chart detailing the operation of the slave beacon in the synchronization mode.

FIG. 9 is a flow chart detailing the operation of the slave beacon in the synchronization mode. The SB is powered on. The SB is in standby mode until an ADV packet is received from the MB. When the ADV packet with a Time Stamp is received the counter value of the SB is set to synchronize with the MB. This is done by removing the fixed value determined by the distance between the SB and the MB as discussed above. Next the SB waits for the Scan Request packet from the mobile device. If no, then wait for the next ADV synchronization event. If the SR is received then stop the slave counter and send data to the cloud.

Figure 10:
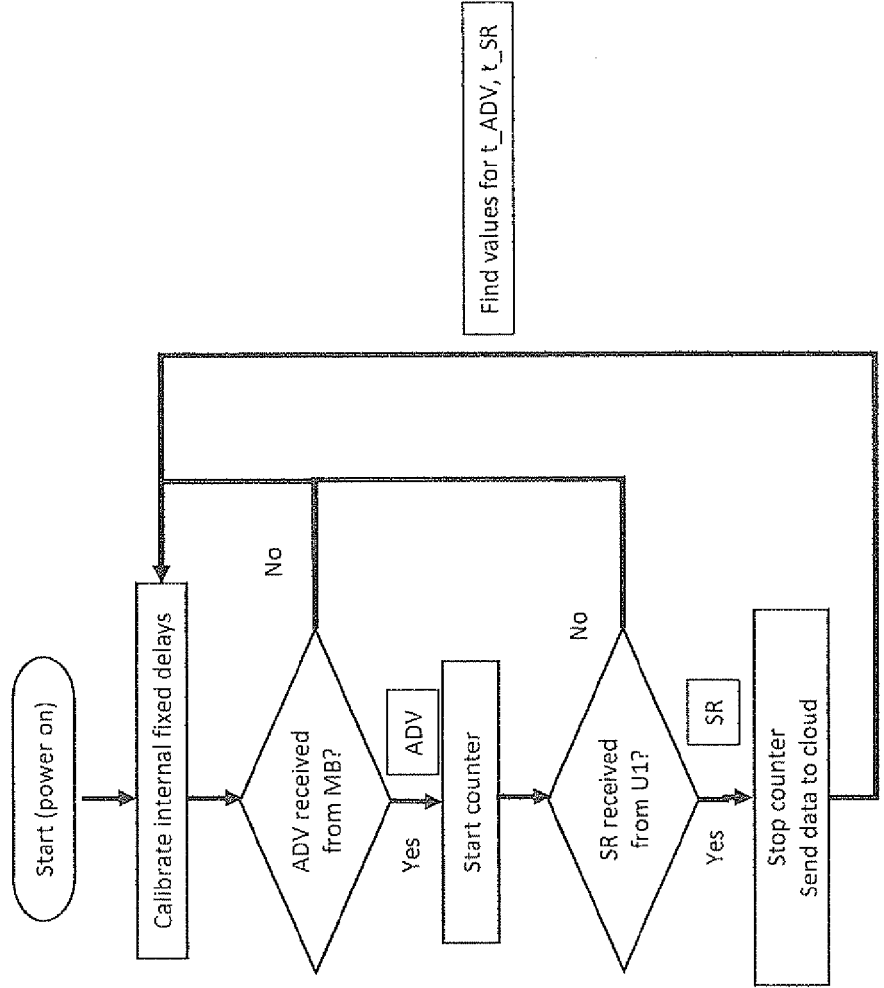
FIG. 10 is a flow chart detailing the operation of the slave beacon in the non-synchronization mode.

FIG. 10 is a flow chart detailing the operation of the slave beacon in the non-synchronization mode. The SB is powered on. The known, internal fixed delays (for processing etc.) are calibrated. The SB is in standby mode until an ADV packet is received from the MB. When the ADV is received the counter is started. If no SR is received then wait for the next ADV (and reset count when received). If the SR is received from the mobile device then stop the counter and send the data to the cloud/server. In the cloud the server provides the ADV time and Scan Request time that the MB recorded but the SB did not.

Analytics of People Using BLE Beacons

The above described system can be implemented to gather various statistical analyses of people carrying mobile devices within the area or venue monitored by the system. The system can monitor the position as well as the dwell time of the user, and record the data to provide additional analytics. Some examples of useful analytics are:

A manager wants to know the number of people who walked in a particular product isle of a supermarket;

A company director wants to know the number of people who visited the stand in an exhibition;

A manager wants to know the number of people who stood in front of a particular artifact in a museum;

A manager wants to know the number of people using the stairs between 7 am and 9 am (for health and safety reason).

The following method can be implemented to provide a low cost, easy to deploy, accurate and anonymous data. The assumption is that each user carries a single mobile device. Of course, this may not be exactly correct as some users do not have mobile devices or have mobile devices that are not BT or BLE enabled. On the other hand, one user may have more than one BT or BLE (or other wireless/radio technology) enabled device. Similarly, it is not uncommon for children to have mobile devices, as well as their parents. In such cases, more than one device will be recorded when, for example, there was only one consumer (the mother) and not two or three (the children accompanying their mother to the supermarket). Various modifications and adjustments can be made to the programming and/or processing in the cloud/server to minimize or compensate for anomalies and exceptions such as those mentioned above.

Manner of Use

Figure 6:
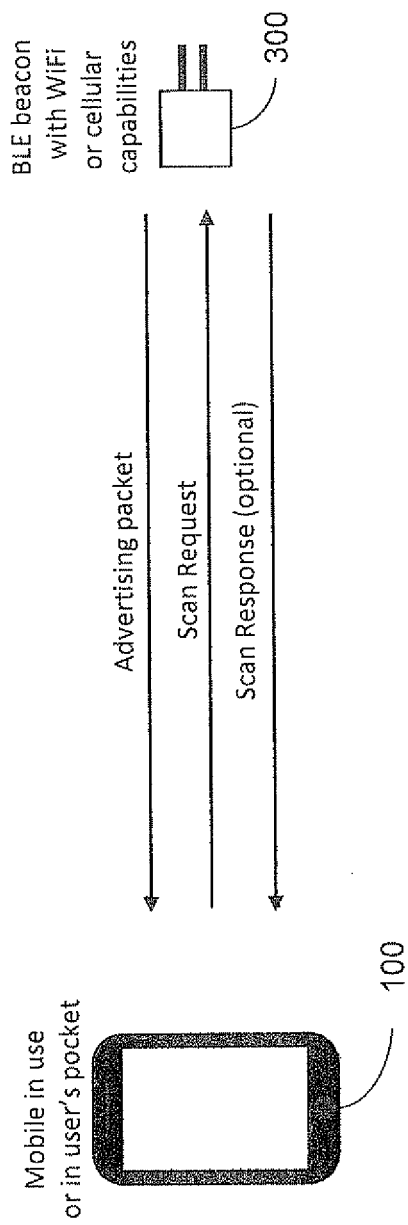
FIG. 6 is a simplified diagram of the method of gathering Analytics data.

FIG. 6 illustrates a simplified diagram of the method of gathering Analytics data. In the Figure, MB 300 broadcasts an Advertising Packet. In a preferred embodiment, the Advertising Packet is a BLE Advertising Packet. Of course, other types of wireless/radio technologies and protocols can be used. In such cases, similar or corresponding data packets or signals can be use in place of those referred to here which relate to BT and BLE technologies/protocols.

Mobile devices within the monitored/targeted area, such as mobile device U1 100, periodically respond to the BLE beacon advertising packet by broadcasting a Scan Request packet. The periodic messages from the mobile devices enable system to document the dwell time of the user, i.e. the amount of time the user stays in the same place or area. The Scan Request packet contains an identifier (ID) of the mobile device (e.g. U1 100) as well as the ID of the beacon.

Each beacon captures/receives the scan request packets from the mobile device, or devices. In some embodiments, the beacons send a Scan Response to the mobile device that sent the scan request. In all embodiments, the beacons send the received packets, together with Time Stamps, to the cloud or local server. As discussed above, the beacons each send the captured/received data to the cloud/server using WiFi or cellular technology. In some embodiments, the data (with time stamps) is transmitted from the beacons to the MB and then the MB, which is WiFi or cellular enabled (or connected in a wired manner to a router), sends all the data to the cloud. In such an embodiment, the other beacons, Slave Beacons, only need to be BLE enabled, and not have WiFi or cellular data communication capabilities. In some embodiments the server is a local server. In such a case, the data from all the beacons may be transmitted via BT or BLE (or some other near-range wireless technology or protocol) to the local server. In all embodiments, once the data arrives in the cloud, it can be processed and/or manipulated according to the needs of the owner.

Additional beacons can be added to service the same area, in order to receive more accurate data. Alternatively or additionally, beacons can be added to increase the coverage of the system and gather additional data. In some embodiments, a directional antenna min a beacon can be used in order to limit the angle of monitoring. Limiting the angle of monitoring can prevent the generation of superfluous data which would otherwise need to be extracted by other means (e.g. during the processing stage). In another embodiment, like with the directional antenna, a lower transmit power can be employed in the beacon in order to limit the distance that the beacon is capable of monitoring.

Seamless Mobile Position

Figure 7:
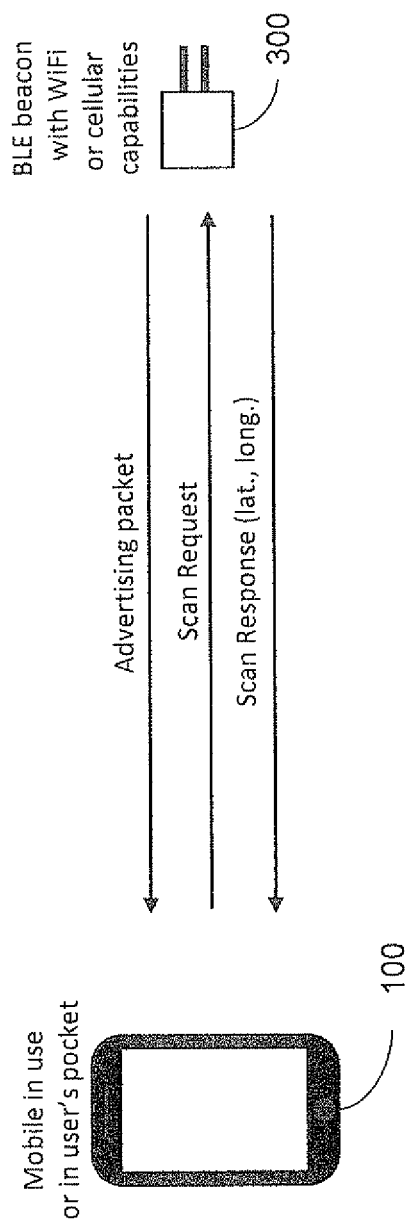
FIG. 7 is a simplified diagram of the method of providing seamless mobile positioning data.

Hereafter is described how the position of the mobile device is transferred from the beacon to the mobile device. FIG. 7 illustrates a simplified diagram of the method of providing seamless mobile positioning data. The invention assumes that position of the mobile device is calculated using the ToF method described above or other similar methods such as, but not limited to, RSSI triangulation and trilateration from WiFi.

In many situations, it is helpful to know one's own exact location—even when indoors. Some of the known systems for calculating location only work outdoors. Others, additionally or alternatively, are inaccurate and only give a general location, not an exact position. All pre-existing methods for calculating indoor location require a user to download a phone specific location application. The application has to actively run on the phone in order to receive the position data. The mobile device must be able to connect to the cloud in order to ascertain and/or receive the user position. Calculating the exact position may not be possible while the mobile device is in a stand-by mode (e.g. while in a pocket etc.).

The presently presented system and method is supported by the operating system of the mobile device and therefore does not require the installation of a unique application. Furthermore, the mobile device does not need to connect to the cloud/Internet as the positioning data is received from the beacon over near-range wireless/radio communications such as BT, BLE and the like.

Figure 11:
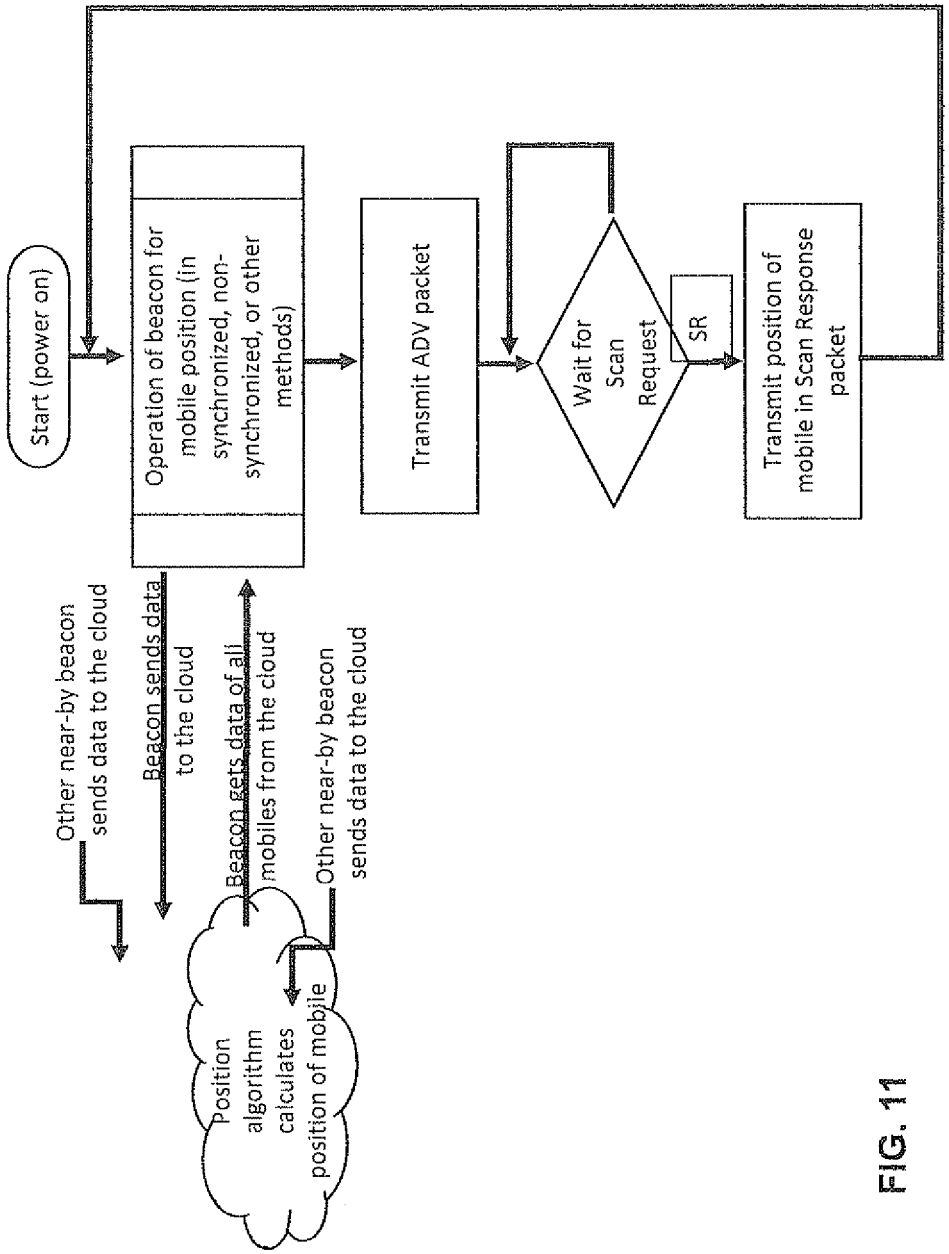
FIG. 11 is a flow diagram of the operation of the beacon according to the Seamless Positioning Method.

FIG. 11 is a flow diagram of the operation of the beacon according to the Seamless Positioning Method. In a first step the beacon is activated. The beacon(s) determines the location of the mobile device using any of: the synchronization method, the non-synchronization method or any other type of method. In the next step the MB 300 broadcasts an Advertising Packet. In a preferred embodiment, the Advertising Packet is a BLE Advertising Packet. Next, the Mobile device, such as mobile device 100, responds to the BLE beacon advertising packet by broadcasting a Scan Request packet. The beacon waits until the scan request packet/signal is received.

The Scan Request packet contains an identifier (ID) of the mobile device (e.g. U1 100) as well as the ID of the beacon (e.g. MB 300). Each beacon captures/receives the scan request packets from the mobile device, or devices. The beacons send the received packets, together with Time Stamps, to the cloud or local server. As discussed above, and therefore not repeated here in full, the beacons each send the captured/received data to the cloud/server using WiFi or cellular technology or to a local server via BT or BLE (or some other near-range wireless technology or protocol). In some embodiment, the slave beacons are only BLE/BT enabled and therefore send the data to MB 300. MB 300 can be a local server or may send the data to the cloud using long range techniques such as WiFi or cellular technology. In all embodiments, once the data arrives in the cloud or at the server, the system calculates the exact position of the mobile device and sends the data (e.g. coordinates, latitude, longitude, altitude etc.) to the MB or another WiFi or cellular enabled beacon.

In the next step, the position of the mobile device is transmitted from the beacon to the mobile device in a Scan Response Packet. In one embodiment, the position is defined by latitude and longitude values. In another embodiment, the position of the mobile device is defined by latitude, longitude and altitude values.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An indoor location system, comprising:
   (a) a server, said server adapted to calculate a position of a mobile device within a predefined indoor location;
   (b) a Master Beacon including:
      (i) a first radio communications capability, over which said master beacon is adapted to periodically broadcast advertising packets and to capture scan request packets broadcast from a mobile device, said first radio communications capability selected from the group comprising Bluetooth and WiFi,
      (ii) a second radio communications capability, over which said master beacon is adapted to transmit data packets to said server and receive data packets from said server, and
      (iii) a master processor, adapted to send data relating to said scan request packets via said second radio communications capability to said server, said data being sent together with a time stamp reflecting a time of receiving said scan request packets; and
   (c) a plurality of Slave Beacons, each said slave beacon including:
      (i) said first radio communications capability, adapted to capture said advertising packets and said scan request packets, and to transmit data packets,
      (ii) a slave processor, adapted to send data relating to said scan request packets to said server, said data being sent together with a time stamp reflecting a time of receiving said scan request packets,
      (iii) a counter, adapted to count a time delay between receiving one of said advertising packets from said master beacon and receiving a subsequent said scan request packet;
   said server is adapted to calculate a respective distance of each said master and slave beacons from said mobile device, and when said slave beacons are non-time-synchronized with said master beacon said server is further adapted to calculate said respective distance of said master beacon and each of said plurality of slave beacons from said mobile device based on each respective said time delay together with a respective known distance between each said slave beacon and said master beacon.

2. The system of claim 1, wherein said respective distances are calculated based on a respective Time of Flight (ToF) value of a signal traveling between each of said master and slave beacons and said mobile device.

3. The system of claim 1, wherein said server is further adapted to calculate a location of said mobile device, based on said respective distances.

4. The system of claim 1, wherein said master beacon is operationally coupled to, or integrated in, said server.

5. The system of claim 1, where said slave beacons are adapted to send said data to said server via said master beacon.

6. The system of claim 1, wherein each of said plurality of slave beacons further includes said second radio communications capability.

7. The system of claim 1, wherein said server is a local server.

8. The system of claim 1, wherein said server is a remote server.

9. The system of claim 1, wherein said master beacon is further adapted to send a time stamp value, via said first radio communications capability, to said plurality of slave beacons and said slave beacons are adapted to synchronize with said master beacon based on said time stamp value.

10. The system of claim 9, wherein said synchronization is effected based on said time stamp coupled with a respective known time delay of signal propagation from said master beacon to each of said plurality of slave beacons.

11. The system of claim 2, wherein said slave processor is further adapted to measure said respective Time of Flight (ToF) values of said signal traveling between each of said slave beacons and said mobile device.

12. The system of claim 2, wherein said master processor is further adapted to measure said Time of Flight (ToF) value of said signal traveling between said master beacon and said mobile device.

13. A method for calculating indoor location, comprising the steps of:
(a) providing a system of claim 1;
(b) broadcasting an advertising packet from said master beacon;
(c) receiving said advertising packet at each of said slave beacons and starting a respective said counter when said advertising packet is received;
(d) receiving a scan request packet at said master beacon and each of said slave beacons from said mobile device, in response to said advertising packet and stopping each respective said counter when receiving said scan request packet at each said slave beacon;
(e) sending respective values of each respective said counter to said server; and
(f) calculating a respective Time of Flight (ToF) value for a signal traveling between said mobile device and each of said master and slave beacons, based on said respective values and known distances between said master beacon and each of said slave beacon;
(g) calculating a position of said mobile device, within said indoor location, based on said respective ToF values.

14. The method of claim 13, wherein said ToF values are further calculated based on respective time stamps related to said scan response packet being received at each of said master and slave beacons.

15. The method of claim 13, further comprising the step of sending said calculated position of said mobile device, to said mobile device.

* * * * *